United States Patent
Curtis et al.

(10) Patent No.: US 6,336,216 B1
(45) Date of Patent: Jan. 1, 2002

(54) OBJECTS ORIENTED PROGRAMMING SYSTEM WITH OBJECTS FOR STORING COMPRESSED DATA FILES AND SELF-EXTRACTING THE DATA FILES

(75) Inventors: Bryce Allen Curtis, Round Rock; Jimmy M. D. Hsu, Austin, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,211

(22) Filed: Dec. 10, 1998

(51) Int. Cl.[7] .................................................. G06F 9/45
(52) U.S. Cl. ......................................................... 717/11
(58) Field of Search ........................................... 717/11

(56) References Cited

U.S. PATENT DOCUMENTS

| | | | |
|---|---|---|---|
| 4,520,819 A | | 6/1985 | Birmingham |
| 4,520,820 A | | 6/1985 | Zitchin |
| 5,280,610 A | * | 1/1994 | Travis et al. .................... 717/1 |
| 5,386,568 A | * | 1/1995 | Wold et al. ..................... 717/10 |
| 5,497,491 A | * | 3/1996 | Mitchell et al. ............. 709/303 |
| 5,569,304 A | | 10/1996 | Ulrich |
| 5,630,131 A | * | 5/1997 | Palevich et al. ................ 717/1 |
| 5,768,597 A | * | 6/1998 | Simm ........................... 717/11 |
| 5,951,636 A | * | 9/1999 | Zerber ........................ 709/202 |
| 5,956,730 A | * | 9/1999 | Burroughs et al. .......... 707/104 |
| 6,073,166 A | * | 6/2000 | Forsen ........................ 709/206 |

OTHER PUBLICATIONS

PCT International Search Report in corresponding international application No. PCT/CA99/00184 issued Sep. 28, 1999; 4 pages.

* cited by examiner

Primary Examiner—Mark R. Powell
Assistant Examiner—John Q. Chavis
(74) Attorney, Agent, or Firm—J. B. Kraft; Paul Kraft; Leslie A. Van Leevwen (57) ABSTRACT

A new class of data file storing objects which have the ability to self-extract, i.e. within objects in the new class, there is a method to extract selected individual files stored in the objects. There is provided a computer controlled object oriented programming system having means for interfacing a plurality of programming objects with each other and including at least one data storage object of an object class comprising means within said object for storing a plurality of data files, and means within said object for extracting said stored data files from said object. The object class is most effectively used with Java objects. The compressed files stored in the objects may be program files. The files are usually compressed into a single file for distribution. In accordance with another aspect of the present invention, there is provided for use in creating and loading the data storage objects, a file adder object interfacing with a data storage object for adding additional files to said data storage object.

24 Claims, 6 Drawing Sheets

OBJECTS ORIENTED PROGRAMMING SYSTEM WITH OBJECTS FOR STORING COMPRESSED DATA FILES AND SELF-EXTRACTING THE DATA FILES

A portion of the disclosure of this patent document contains material which is subject to copyright protection. The copyright owner has objection to facsimile reproduction by anyone of the patent disclosure, as it appears in the Patent and Trademark Office files or records, but otherwise reserves all copyright rights whatsoever.

TECHNICAL FIELD

The present invention relates to user-interactive object oriented programming systems and particularly to such object oriented programming systems which would be available to both program developers and interactive users of such programs, particularly in a networking environment such as the Internet or equivalent proprietary or public networks.

BACKGROUND OF RELATED ART

The 1990's decade has been marked by a technological revolution driven by the convergence of the data processing industry with the consumer electronics industry. The effect has, in turn, driven technologies which have been known and available but relatively quiescent over the years. Two of these technologies are the Internet related distribution and object oriented programming systems. Both of these technologies are embodied in the object oriented Java ("Java" is a trademark of Sun Microsystems, Inc.) programming system. The computer and communications industries have been extensively participating in the development and continual upgrading of the Java system. For details and background with respect to the Java system, reference may be made to a typical text, "Just Java", 2nd Edition, Peter van der Linden, Sun Microsystems, 1997, or the text, "Thinking in Java", Bruce Eckel, Prentice Hall, 1998. The convergence of the electronic entertainment and consumer industries with data processing exponentially accelerated the demand for wide ranging communication distribution channels, and the World Wide Web or Internet which had quietly existed for over a generation as a loose academic and government data distribution facility reached "critical mass" and commenced a period of phenomenal expansion which has not, as yet, abated.

Object oriented programming, which also had been virtually languishing for a generation, offered the ideal distribution vehicle for the Internet. With its potentially interchangeable objects or units within which both data attributes and functions were stored in a predefined uniform framework, as well as the predefined object interfaces with each other, object oriented programming systems have found acceptance as the programming system for the Internet. In all areas of data processing, communications, as well as the electronic entertainment and consumer industries, having anything to do with the Internet, there has been a substantial movement to Java, the Sun Microsystems originated object oriented programming system.

One obvious need of the Internet is the rapid distribution of large amounts of data. Such data is conventionally distributed in compressed form; for example, a large number of data files compressed into a comprehensive file or distribution unit. One such facility, which is used in the distribution of Java files over the Internet, is the Java JAR (Java Archive) utility which makes use of a Zip-like group of files compressed into a single compressed file which is then transmitted over the Internet. These Java Jar compressed files are cross platform or platform independent. They may include audio and video, as well as Java class files. These files are conventionally compressed into a single file containing the collection of zipped files by a conventional compression process such as Sun's JDK and are transmitted along with a manifest describing them. This Jar utility is described in greater detail on pp. 487–488 of the previously mentioned, "Thinking in Java", Bruce Eckel. The use of Java Jar, Gzip or Zip utilities presumes the availability of some kind of extraction utility at a receiving station in order to extract and then uncompress the files as needed. In view of the vast and varied nature of a distribution network such as the Internet, it is not certain that an appropriate extraction utility will be available at a receiving station.

SUMMARY OF THE PRESENT INVENTION

The present invention solves the above problem by providing a new class of data file storing objects which have the ability to self-extract, i.e. within objects in the new class, there is a method to extract selected individual files stored in the objects. Thus, the present invention provides a computer controlled object oriented programming system having means for interfacing a plurality of programming objects with each other and including at least one data storage object of an object class comprising means within said object for storing a plurality of data files, and means within said object for extracting said stored data files from said object. The invention is most effectively used with Java objects. The compressed files stored in the objects may be program files. The files are usually compressed into a single file for distribution. In accordance with another aspect of the present invention, there is provided for use in creating and loading the data storage objects, a FileAdder object interfacing with a data storage object for adding additional files to said data storage object.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Before going into the details of specific embodiments, it will be helpful to understand from a more general perspective the various elements and methods which may be used to implement the present invention. The present invention is implemented using the Java Programming system, which is an object oriented system utilizing the Java programming language. The Java system and language are extensively familiar to those skilled in the art. The texts, "Thinking in Java", Bruce Eckel, and "Just Java", Peter van der Linden, described above, comprehensively detail the system and language. Nonetheless, it should be helpful to generally review the known principles of object oriented programming.

It should be understood by those skilled in the art that object oriented programming techniques involve the definition, creation, use and instruction of "objects". These objects are software entities comprising data elements or attributes and methods, which manipulate the data elements. Objects may also include data related to events outside of the object to trigger or control methods within the object. The data and related methods are treated by the software as an entity and can be created, used and deleted as such. The data and functions enable objects to model their real world equivalent entity in terms of its attributes, which can be represented by the data elements, and its behavior, which can be represented by its methods.

Objects are defined by creating "classes" which are not objects themselves, but which act as templates which instruct a compiler how to construct the actual object. For example, a class may specify the number and type of data variables and the steps involved in the functions which manipulate the data. An object is actually created in the program by means of a special function called a constructor which uses the corresponding class definition and additional information, such as arguments provided during object creation, to construct the object. Objects are destroyed by a special function called a destructor.

Many benefits arise out of three basic properties of object oriented programming techniques, encapsulation, polymorphism and inheritance. Objects can be designed to hide or encapsulate all or a portion of the internal data structure and the internal functions. More particularly, during program design, a program developer can define objects in which all or some of the data variables and all or some of the related methods are considered "private" or for use only by the object itself. Other data or methods can be declared "public" or available for use by other software programs. Access to the private variables and methods by other programs can be controlled by defining public methods which access the object's private data. The public methods form an interface between the private data and external programs. An attempt to write program code which directly accesses the private variables causes a compiler to generate an error during program compilation. This error stops the compilation process and prevents the program from being run.

Polymorphism allows objects and functions which have the same overall format but which work with different data to function differently to produce consistent results. For example, an object may have a format of attribute data and methods to support a geometric shape. The same format can be used whether the shape is a rectangle or a circle. However, the actual program code which performs the shape formation may differ widely depending on the type of variables which comprise the shape. After the methods have been defined, a program can later refer to the shape formation method by its common format and, during compilation, the compiler will determine which of the shaping methods to use by examining the variable types. The compiler will then substitute the proper function code.

A third property of object oriented programming is inheritance which allows program developers to reuse pre-existing programs. Inheritance allows a software developer to define classes and the objects which are later created from them as related through a class hierarchy. Specifically, classes may be designated as subclasses of other base classes. A subclass "inherits" and has access to all of the public functions of its base classes as though these functions appeared in the subclass. Alternatively, a subclass can override some or all of its inherited functions or may modify some or all of its inherited functions by defining a new function with the same form.

Figure 1:
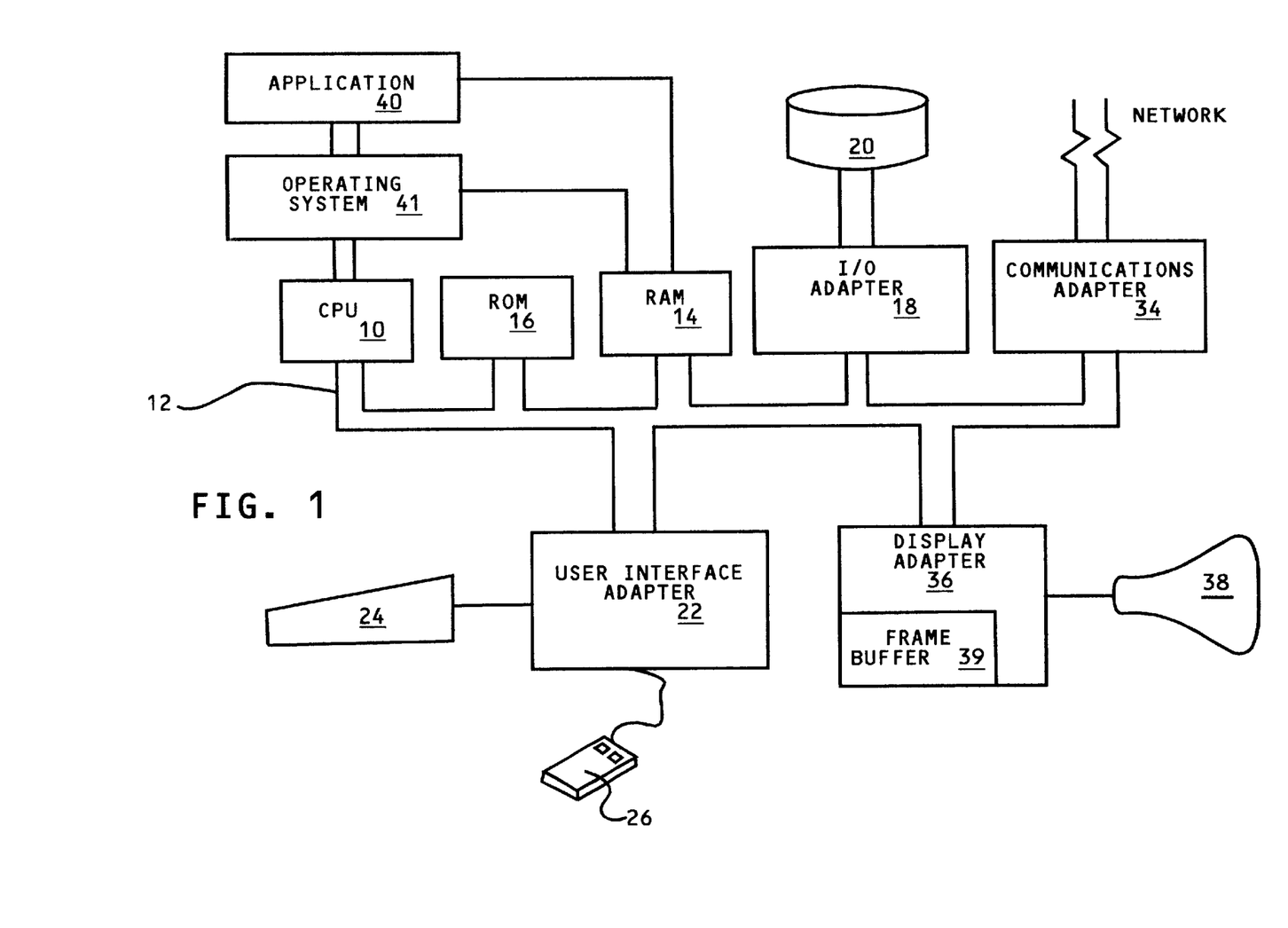
FIG. 1 is a block diagram of a data processing system including a central processing unit and network connections via a communications adapter which is capable of implementing the present invention.

Referring to FIG. 1, a typical data processing system is shown which may be used in conjunction with object oriented software, such as Java, in implementing the present invention. A central processing unit (CPU), such as one of the PC microprocessors or workstations, e.g. RISC System/6000(™) ("RISC SystemL/6000" is a trademark of International Business Machines Corporation) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as AIX 6000(™) or OS/2(™) ("AIX 6000" and "OS/2" are trademarks of International Business Machines Corporation) operating system available from IBM; Microsoft's Windows 95(™) or Windows NT(™), as well as UNIX and AIX operating systems. Application programs 40, controlled by the system, are moved into and out of the main memory RAM (random access memory) 14. These programs include overall Java programming systems and the programs of the present invention to be subsequently described in combination with overall Java programming systems. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. I/O adapter 18 may be a small computer system interface (SCSI) adapter that communicates with the disk storage device 20. Communications adapter 34 interconnects bus 12 with an outside network enabling the data processing system to communicate with other such systems over a local area network (LAN) or wide area network (WAN), which includes, of course, the Web or Internet. I/O devices are also connected to system bus 12 via user interface adapter 22 and display adapter 36. Keyboard 24 and mouse 26 are all interconnected to bus 12 through user interface adapter 22. It is through such input devices that the user may interactively relate to the programs of this invention for creating self-extracting data file storage objects, adding data files to such objects and extracting data files from such objects. The PC and workstations of FIG. 1 may be transmitting stations where the self-extracting data objects are created, loaded with data files and sent over a network such as the Internet, and the stations may also function as receiving stations on such networks where the self-extracting objects are received and the stored files extracted and uncompressed.

Display adapter 36 includes a frame buffer 39, which is a storage device that holds a representation of each pixel on the display screen 38 Images may be stored in frame buffer 39 for display on monitor 38 through various components such as a digital to analog converter (not shown) and the like. By using the aforementioned I/O devices, a user is capable of inputting information to the system through the keyboard 24 or mouse 26 and receiving output information from the system via display 38.

Since the present invention is implemented in the Java object oriented programming system, some initial comments concerning object oriented programming principles as embodied in Java should be appropriate. Since object oriented programming systems have been rapidly developing in recent years, including systems and languages other than Java, there is still an absence of universality in the terminology which is being used in the art to describe various object oriented programming functions. It will be understood by those skilled in the art that other terms may have been used to describe the principles which we will discuss herein As set forth in the above-mentioned references, Java is a fully object oriented programming system which operates on a basic operating system such as Windows or OS/2. Java includes a wealth of frameworks, class libraries and a new programming environment intended to greatly enhance application software development on the Internet. It is intended to be fully portable between operating systems. There is a defined commonality between users factored into a set of services and frameworks. In Java, as in all highly sophisticated object oriented systems, writing an application program means creating a set of linked objects integrated into the Java operating system platform. Software developers rely on this platform for both a sophisticated set of services and a framework to develop software. The frameworks provide powerful abstractions which permit software developers to concentrate on their problem rather than building up infrastructure. Furthermore, the abstractions for the software developer are very close to the fundamental concepts that a user must understand to operate his software. All this makes the development of applications easier.

Figure 2:
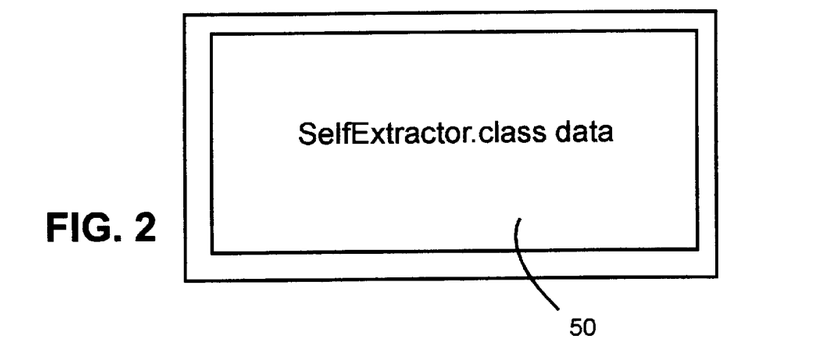
FIG. 2 is a generalized diagrammatic illustration of the SelfExtractor class object of the present invention prior to the loading data files.

An embodiment of the present invention will be described with respect to FIGS. 2 through 5 which are diagrammatic illustrations of the content of the SelfExtractor data file storage objects of the present invention before and after loading. FIG. 2 illustrates an empty SelfExtractor data file storage object. It contains no data files as yet. It only has data section 50 which contains the basic data defining the new SelfExtractor class of objects. The data defining the class is generally made up of two elements: data members, also referred to as fields or attributes; and member functions or methods. More details on the data needed to define or create classes may found at pp. 75–79 in the above-referenced, "Thinking in Java", Bruce Eckel.

Figure 3:
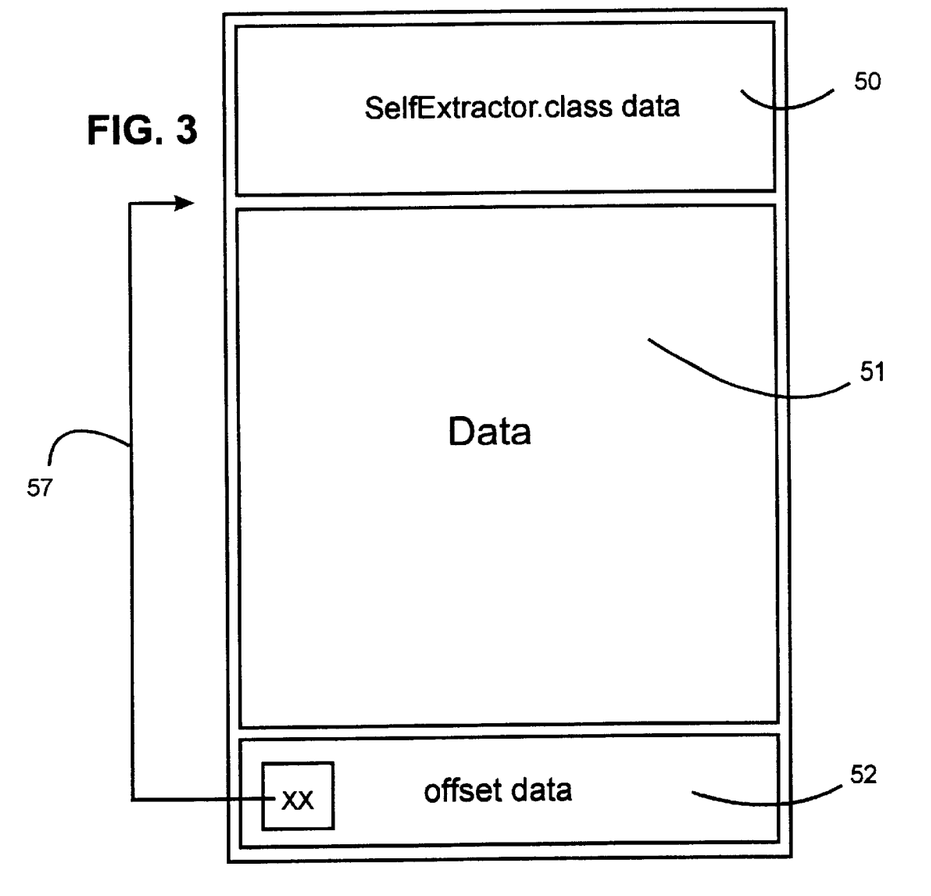
FIG. 3 is the SelfExtractor class object illustrated in FIG. 2 after a group of compressed data files have been loaded as an unseparated file.
Figure 4:
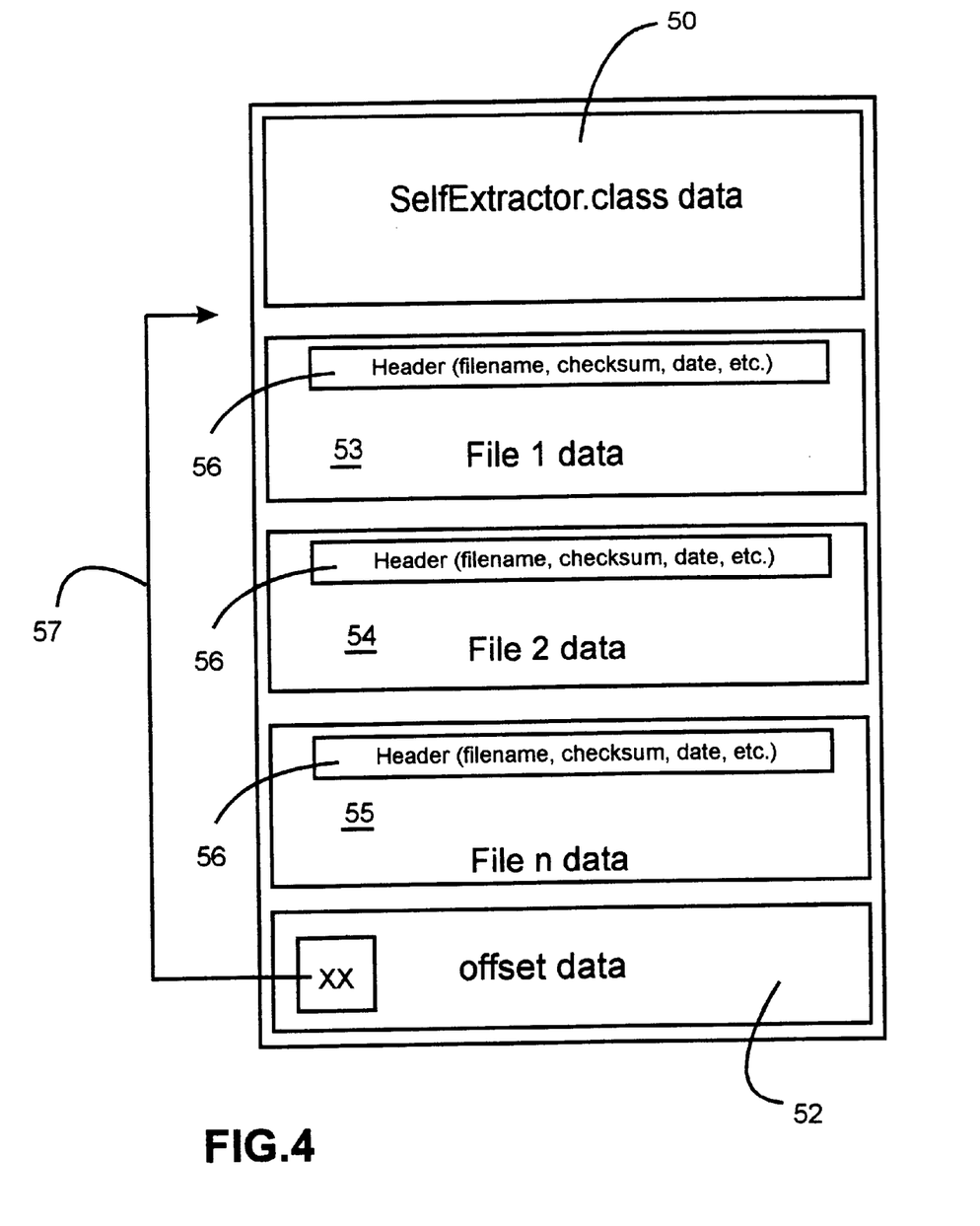
FIG. 4 is the SelfExtractor class object illustrated in FIG. 2 after a group of compressed data files have been loaded as separate files.
Figure 6:
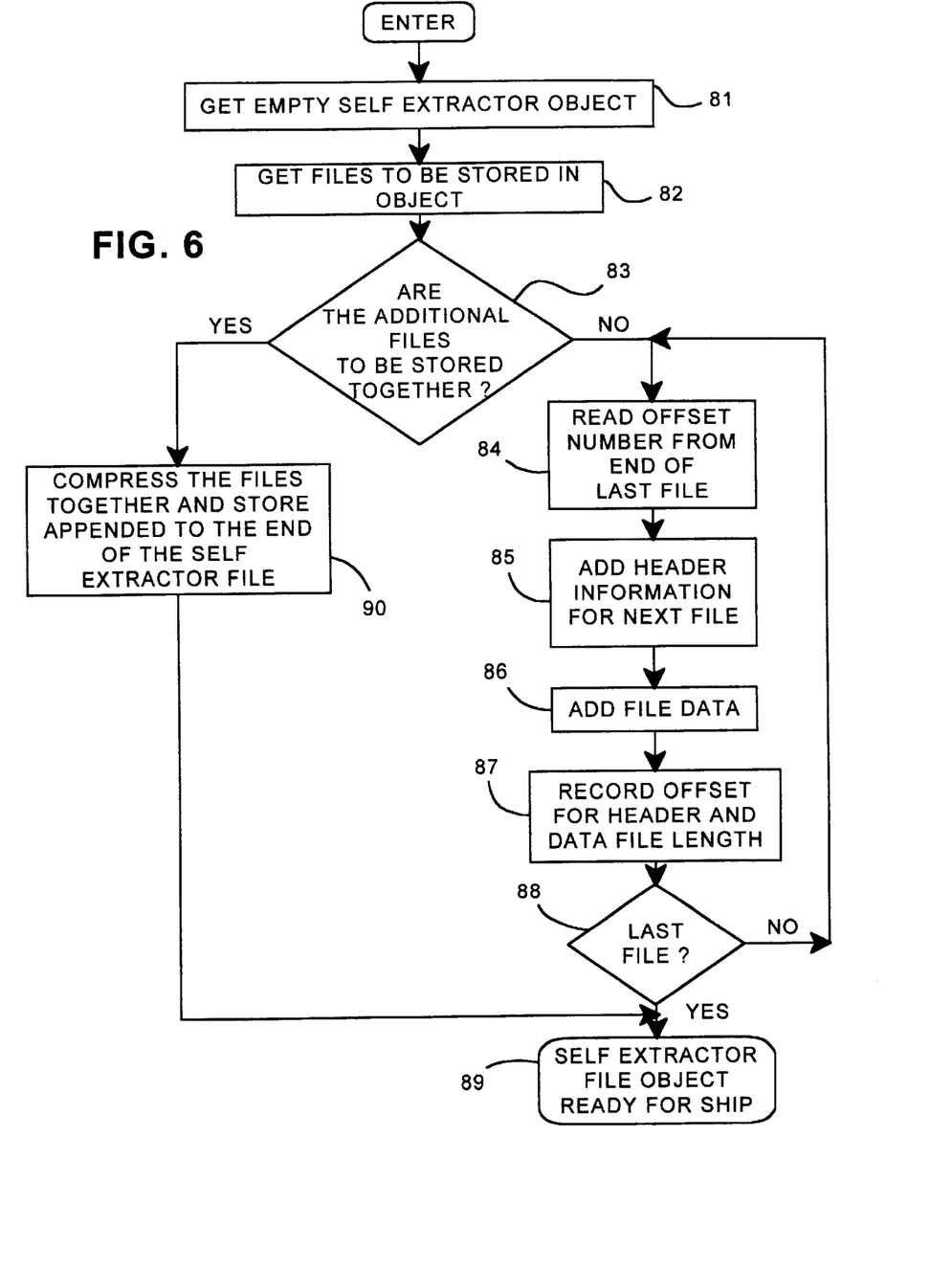
FIG. 6 is a flowchart of the program routine used for the addition or loading of data files to the self-extracting objects of the present invention.

FIG. 3 shows the data organization within the object after the data files to be transmitted within the SelfExtractor object have been compressed and loaded into the object as a single compressed data file 51 in accordance with the add files routine to be subsequently described with respect to the flowchart of FIG. 6. The object in FIG. 3 contains a data section for tracking offset data through the control of pointer 57 which will track the positions of data in the data file 51 during self-extraction to be subsequently described in detail with respect to the flowchart of FIG. 7. FIG. 4 shows the data organization within the object after the data files to be transmitted within the SelfExtractor object have been compressed and loaded into the object as several compressed but separately stored data files 53 through 55, also in accordance with the add files routine to be subsequently described with respect to the flowchart of FIG. 6. Each of the data files has a header 56 which will provide sufficient information to determine whether the file is to be read out and uncompressed in the self-extraction to be subsequently described in detail with respect to the flowchart of FIG. 7. The object in FIG. 4 also contains an offset data section 52 for tracking offset data through the control of pointer 57 which will track the positions of data in the data file 51 during self-extraction.

Figure 5:
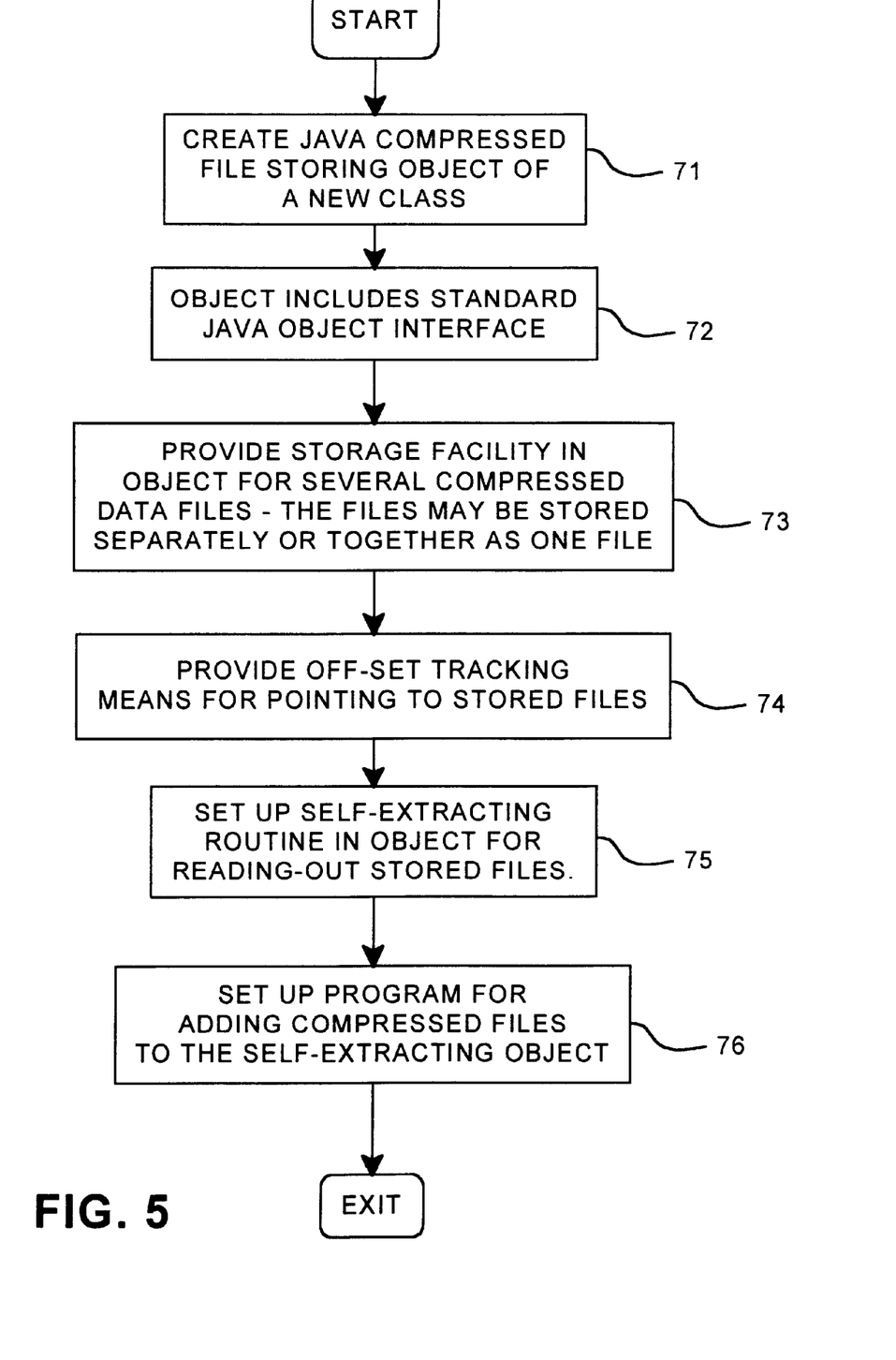
FIG. 5 is a flowchart setting forth the use of programming resources in developing the self-extracting data file object class of the present invention.

Now, with reference to FIG. 5, there will be described the development of the programming resources used in the practice of the present invention. Step 71, the new class of Java objects: SelfExtractor data file storage objects as described in FIGS. 2 through 4 is created. The Java object includes the conventional Java object framework and interface properties, step 72, so that it may be interfaced with other Java objects. The object is set up with data storage facility for a plurality of data files, either compressed as a single files or as several separate respective files, step 73. Offset tracking means for pointing to stored files are provided, step 74, for the tracking of the compressed files during extraction. The self-extraction routine is set up, step 75. This will subsequently be described in detail with respect to FIG. 7. Also, step 76, a program for adding files to the SelfExtractor object is provided. This will be described in greater detail with respect to FIG. 6.

Now, with respect to the flowchart of FIG. 6, there will be described an illustration of how data files may be loaded in the SelfExtractor objects of the present invention. Step 81, commence with an empty SelfExtractor object like that shown in FIG. 2. The data files to be stored in an object are gotten, step 82. A determination is made in decision step 83 as to whether the data files are to be stored together. If Yes, then the group of files are compressed together into a single file, step 90, which is stored added to the end of whatever files are already stored in the object to provide an object structure as shown in FIG. 3. The SelfExtractor object is now ready for transmission, step 89. If the decision from step 83 is No, then the offset number of the last already stored file is read, step 84, and the header information for the next compressed separate data file is added, step 85. The file data for this next file is then added, step 86. The offset for both the header length and the data file length are recorded, step 87. A determination is then made as to whether the last file has been loaded into the object, step 88. If Yes, then the SelfExtractor object is now ready for transmission, step 89. If No, then the process is returned to step 84, and the above-described process is continued.

Now, with respect to FIG. 7, there will be described a process according to the present invention for the self-extracting of data files from the object. We will assume that a SelfExtractor object has been loaded with data files in accordance with the process of FIG. 6 and transmitted to a receiving station where files are to be extracted. First, step 100, the offset number at the end of the SelfExtractor object is read. Then, in decision step 101, a determination is made in the received object as to whether the files are compressed and stored as a single file. If Yes, then, step 109, a stream is opened to the data file in the object, starting at the offset number. Then, the SelfExtractor process uncompresses data from the stream at this point and writes out the sequence of individual data files to the local file system requiring the files, step 110. Then, step 111, a determination is made as to whether the offset number has been reached. If Yes, then the extraction is ended. If No, then the procession is returned to step 110 where the extraction is continued until step ill indicates Yes, the extraction is completed.

Figure 7:
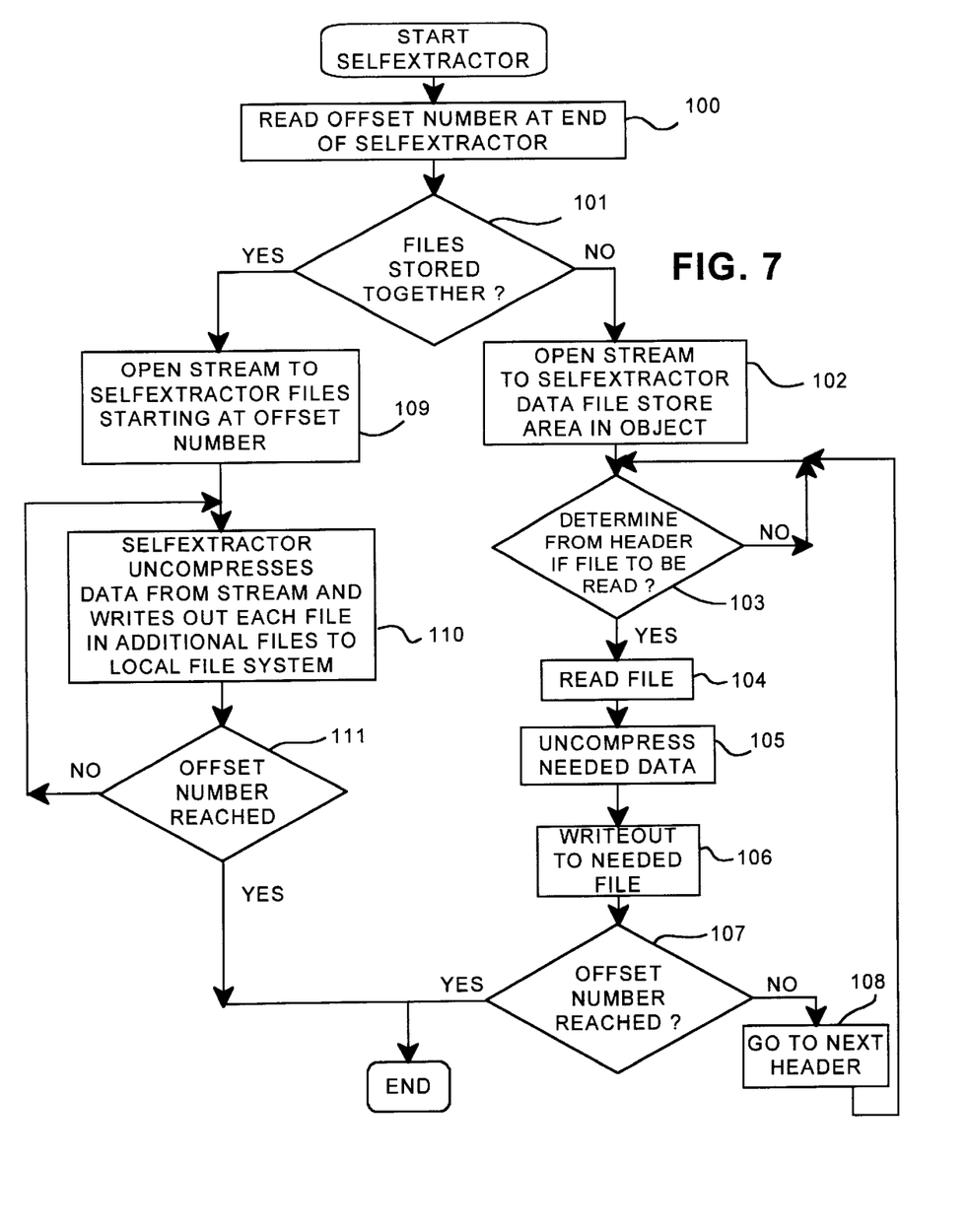
FIG. 7 is a flowchart of the program steps involved in the self-extraction of data files from the objects of the present invention.

If the decision from step 101 is that the data files are not stored together in the object but are stored as individual files as shown in FIG. 4, then step 102, FIG. 7, the stream is opened to the individual files, e.g. files 53, 54 and 55, FIG. 4. Then, as each header 56 is reached, it is read and a determination is made, step 103, as to whether the file is to be read. It should be noted that with such individually stored data files, the files may be selectively read out based upon distinguishing header data. This is unlike the storage of the data files as a single compressed file as previously described where all of the data files have to be sequentially uncompressed and read out. If the determination from step 103 is No, i.e. the file is not selected to be read out, then the process returns to step 103 and a determination is made from the header of the next data file as to whether the next data file is to be read out. If Yes, the individual data file is read, step 104, it is uncompressed, step 105, and the data is written out to the storage point where needed at the receiving station, step 106. At this point, a determination is made, step 107, as to whether the offset number originally read in step 100 has been reached. If Yes, the readout is complete and ended. If No, then, step 108, the next header is read and the process is returned to step 103 where the above-described process is continued.

The following two programs with instructions in Java programming language are illustrative programs for: 1) adding or loading of data files into the SelfExtractor object, and 2) a program stored in the object for self-extraction of data files:

FileAdder
Program code to add information to a class file:

```
// Open the original class file
FileInputStream fi = new FileInputStream("OrigInstall.class");
// Open the new class file
DataOutputStream fo =
new DataOutputStream(new FileOutputStream("install.class"));
// Copy the original class file to the new class file
byte barray [] = new byte[1000];
int size = 0;
int b = 0;
do }
    b = fi.read(barray);
    if (b != -1) {
        fo.write(barray, 0, b);
        size += b;
    }
} while (b != -1);
fi.close();
// Copy extra information located in a file to the new class file
fi = new FileInputStream("data");
do
    b = fi.read(barray);
    if (b != -1)
        fo.write(barray, 0, b);
} while (b != -1);
fi.close ();
//save the offset into the new file where the extra
//information is located. This offset is saved in the
```

-continued

```
//last 4 bytes of the file.
fo.writeInt(size);
fo.close();
```

Copyrighted 1998, International Business Machine Corp.
SelfExtractor

```
//***********************************************
// First, we want to find out where the extra information
// is stored.
//***********************************************
// Open class file.
RandomAccessFile raf = new RandomAccessFile("install.class", "r");
// Find out the offset into the class file where the information
// is located. This offset is written in the last 4 bytes of the
// class file.
long offset = raf.length() - 4;
raf.seek(offset);
int pos = raf.readInt();
// Close class file
raf.close();
//***********************************************
// Second, we want to read the extra information.
//***********************************************
//Open class file again - this time to read the information.
FileInputStream fis = new FileInputStream("install.class");
// Skip to where the information is stored.
byte barray [] = new byte[pos];
fis.read(barray);
// Begin extracting information by reading from the fis input stream.
System.out.print("Extracting information . . . ");
//Close class file
fis.close();
```

Copyrighted 1998, International Business Corp.

One of the preferred implementations of the present invention is as an application program made up of programming steps or instructions resident in RAM 14, FIG. 1, during computer operations. Until required by the computer system, the program instructions may be stored in another readable medium, e.g. in disk drive 20, or in a removable memory such as an optical disk for use in a CD-ROM computer input or in a floppy disk for use in a floppy disk drive computer input. Further, the program instructions may be stored in the memory of another computer prior to use in the system of the present invention and transmitted over a LAN or a WAN such as the Internet when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled object oriented programming system having means for interfacing a plurality of programming objects with each other and including at least one data storage object of an object class comprising:

means within said data storage object for storing a plurality of data files, and means within said data storage object for extracting said stored data files from said data storage object.

2. The object oriented programming system of claim 1 wherein the Java programming language is used.

3. The object oriented programming system of claim 1 wherein at least one of said data files is stored in compressed form.

4. The object oriented programming system of claim 3 wherein said compressed file is a compressed program file.

5. The object oriented programming system of claim 4 wherein a plurality of said data files are stored in compressed form within said data storage object.

6. The object oriented programming system of claim 5 wherein said plurality of stored files are compressed together into a single file.

7. The object oriented programming system of claim 3 further including means for uncompressing extracted data files.

8. The object oriented programming system of claim 5 further including a file adder object interfacing with a data storage object for adding additional files to said data storage object.

9. A computer controlled method of object oriented programming with a plurality of programming objects interfacing with each other and including at least one data storage object of an object class enabling:

storing a plurality of data files within said data storage object, and storing within said data storage object, a method for extracting said stored data files from within said data storage object.

10. The object oriented programming method of claim 9 wherein the Java programming language is used.

11. The object oriented programming method of claim 9 wherein at least one of said data files is stored in compressed form.

12. The object oriented programming method of claim 11 wherein said compressed file is a compressed program file.

13. The object oriented programming method of claim 11 wherein a plurality of said data files are stored in compressed form within said data storage object.

14. The object oriented programming method of claim 13 wherein said plurality of data files stored in compressed form within said data storage object are compressed together into a single file.

15. The object oriented programming method of claim 13 further including the step of uncompressing extracted data files.

16. The object oriented programming method of claim 13 further including the steps of interfacing a file adder object with a data storage object for adding additional files to said data storage object.

17. In a computer controlled object oriented programming system having means for interfacing a plurality of programming objects with each other, a computer program having program code included on a computer readable medium including at least one data storage object of an object class comprising:

means within said data storage object for storing a plurality of data files, and means within said data storage object for extracting said stored data files from said data storage object.

18. The computer program of claim 17 wherein the Java programming language is used.

19. The computer program of claim 17 wherein at least one of said data files is stored in compressed form.

20. The computer program of claim 19 wherein said compressed file is a compressed program file.

21. The computer program of claim 19 wherein a plurality of said data files are stored in compressed form within said data storage object.

22. The computer program of claim 19 wherein said plurality of stored files are compressed together into a single file.

23. The computer program of claim 19 further including means for uncompressing extracted data files.

24. The computer program of claim 21 further including a file adder object interfacing with a data storage object for adding additional files to said data storage object.

* * * * *